United States Patent
Stern (10) Patent No.: US 7,603,474 B2
(45) Date of Patent: Oct. 13, 2009

(54) EFFICIENT ENDPOINT MATCHING USING A HEADER-TO-BIT CONVERSION TABLE

(75) Inventor: Aaron A. Stern, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 715 days.

(21) Appl. No.: 11/244,669

(22) Filed: Oct. 5, 2005

(65) Prior Publication Data

US 2007/0078997 A1    Apr. 5, 2007

(51) Int. Cl.
G06F 15/16   (2006.01)
G06F 15/173  (2006.01)

(52) U.S. Cl. ....................... 709/232; 709/238
(58) Field of Classification Search ......... 709/230–244, 709/201–203; 718/100–108
See application file for complete search history.

(56) References Cited

U.S. PATENT DOCUMENTS

| | | | | |
|---|---|---|---|---|
| 6,289,014 | B1* | 9/2001 | Hoshino et al. | 370/392 |
| 6,782,542 | B1 | 8/2004 | Mein et al. | 719/330 |
| 6,789,126 | B1 | 9/2004 | Saulpaugh et al. | 709/245 |
| 6,792,466 | B1 | 9/2004 | Saulpaugh et al. | 709/229 |
| 6,798,755 | B2 | 9/2004 | Lillie et al. | 370/312 |
| 6,850,979 | B1 | 2/2005 | Saulpaugh et al. | 709/225 |
| 7,315,541 | B1* | 1/2008 | Housel et al. | 370/392 |
| 2002/0057692 | A1 | 5/2002 | Kliland et al. | 370/393 |
| 2003/0212818 | A1* | 11/2003 | Klein et al. | 709/238 |
| 2003/0233420 | A1 | 12/2003 | Stark et al. | 709/206 |
| 2004/0095925 | A1 | 5/2004 | Cody et al. | 370/352 |
| 2005/0149935 | A1 | 7/2005 | Benedetti | 718/102 |
| 2005/0204051 | A1 | 9/2005 | Box et al. | 709/230 |
| 2005/0286519 | A1 | 12/2005 | Ravikumar et al. | 370/389 |
| 2008/0071927 | A1* | 3/2008 | Lee | 709/245 |

OTHER PUBLICATIONS

Jesus Rodriguez, "*Content Based Routing Web Services in .NET and J2EE*," Jun. 30, 2004, available at http://www.c-sharpcorner.com/Code/2004/June/ContentBasedWS.asp (PDF enclosed entitled "Article 1," 12 pgs.).
Sameer Tyagi, "*Realizing Strategies for Document-Based Web Services With JAX-WS 2.0: Part 3 in a Series*," Dec. 2005, available at http://java.sun.com/developer/technicalArticles/xml/jaxrpcpatterns3/ (PDF enclosed entitled "Article 2," 17 pgs.).
Roman Kiss "*WS-Transfer for WCF (Indigo)*," Jul. 2005, available at http://www.codeproject.com/soap/WSTransfer.asp (PDF enclosed entitled "Article 3," 32 pgs.).

* cited by examiner

*Primary Examiner*—Joseph E Avellino
*Assistant Examiner*—Afshawn Towfighi
(74) *Attorney, Agent, or Firm*—Workman Nydegger (57) ABSTRACT

A header-to-bit conversion table is provided that includes a list of address headers for registered endpoints. Assigned to each address header within the list is a bit placement within a string of bits. As messages are received, select headers within a message are compared with the address headers within the list. Each intersection or match for headers sets a bit true within a bit array for the message corresponding to the bit assignment for the header within the header-to-bit conversion table. Such array may then be compared with bit masks for each endpoint, wherein those bits set true within the bit masks represent those headers needed to satisfy the criteria for a particular endpoint. If a match is found, the message (or portion(s) thereof) may be sent to the particular endpoint for processing.

16 Claims, 8 Drawing Sheets

EFFICIENT ENDPOINT MATCHING USING A HEADER-TO-BIT CONVERSION TABLE

CROSS-REFERENCE TO RELATED APPLICATIONS

N/A

BACKGROUND

Background and Relevant Art

Although computers were once isolated and had minimal or little interaction with other computers, today's computers interact with a wide variety of other computers through Local Area Networks (LANs), Wide Area Networks (WANs), dial-up connections, and so forth. With the wide-spread growth of the Internet, connectivity between computers is becoming more important and has opened up many new applications and technologies. The growth of large-scale networks, and the wide-spread availability of low-cost personal computers, has fundamentally changed the way that many people work, interact, communicate, and play.

A relatively new and evolving communication protocol for sending messages between computing devices via the Internet is known as Simple Object Access Protocol, or SOAP. SOAP and other similar messaging protocols are based on the extensible Markup Language (XML), which is a language for structuring, storing, and sending data. Such messaging protocols provide a way to communicate between applications running on different operating systems, with different technologies and programming languages. Accordingly, these protocols are platform and language agnostic, yet simple and extensible.

Often, electronic communication using such messaging protocols includes a client computer system (hereafter referred to as a "client") requesting access to a network service (e.g., Web Services) at a server computer system (hereinafter referred to as a "service"). Accordingly, the client sends a request to the service for particular access to its system resources, wherein if the client is authorized and validated the service responds with a response message providing the desired information. Of course, this request/response type communication is governed by various requirements and capabilities defined by both the client and the service, wherein each must be conformant to the others policies.

Policies and other endpoint information will typically be defined in various headers of a message, which are used to determine the appropriate endpoint to which a message (or portions thereof) will be sent for processing. Accordingly, endpoints will register with the receiving computing device by posting an endpoint address (e.g., an endpoint reference as defined by web service addressing (WS-Addressing) specification) with various address headers including specific structures and values that a message will need in order to satisfy criteria for that particular endpoint. For example, a security endpoint will require a particular set of header information within a message, whereas other endpoints such as reliable messaging may require their own unique set of headers.

As messages are received, their header information is compared with each address header for each endpoint within each service to determine the appropriate endpoint(s) to send the message to. Determining whether a message satisfies an endpoint's criteria, however, can be computationally expensive. For example, headers can differ in such things as white space and ordering of attributes and values, yet be functionally equivalent. As such, in order to determine if a message header is the same as an endpoint's requirements, it typically needs to be normalized to a standard form using heavy weight canonical rules and techniques. Accordingly, when a single message needs to be compared to multiple endpoint addresses using the one-to-one comparison described above, this and other factors severely slow the determination of those endpoints that are to process the message. Nevertheless, since this determination must be done for each message that is received and each endpoint that a receiver has registered it is important for the comparison to happen as efficiently as possible.

BRIEF SUMMARY

The above-identified deficiencies and drawbacks of current mechanisms for determining those endpoints for which at least a portion of a message is destined are overcome through example embodiments provided herein. The following Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Exemplary embodiments provide for efficiently determining those registered endpoints for which at least a portion of a message is destine, without having to compare each message header with each address header for each endpoint within each service. In this embodiment, a message is received that includes a set of message headers comprising information used in determining those endpoints for which the message is destined for processing. A message header bit array may be created by comparing the set of message headers (or portion(s) thereof) with a list of address headers within a header-to-bit conversion table. Each bit set true in the message header bit array represents a match and appropriate bit placement corresponding to an address header within the list. Endpoint bit mask(s) are also received, wherein each bit set true within the endpoint bit mask(s) represents a header from the list of address headers that the message needs to have in order to satisfy criteria for a particular endpoint receiver. Thereafter, the message header bit array is compared to the endpoint bit mask(s) for determining those endpoints for which at least a portion of the message is destined.

Other exemplary embodiments provide for the creation of a header-to-bit conversion table, which is used in converting headers within a message to an array of bits for efficiently determining those registered endpoints for which at least a portion of a message is destined for processing. In this embodiment, a list of address headers for various endpoints are collected, wherein each address header within the list represents information a message needs for satisfying at least a portion of criteria for the endpoints. If duplicate address headers exist within the list of address headers across different endpoints, such duplications can be eliminated. Thereafter, a bit placement is assigned to each address header within the list to produce an array of bits representing each of the address headers. Further, the bit placement of the address headers is mapped to their corresponding address header information in order to create a header-to-bit conversion table. Such header-to-bit conversion table is then stored for subsequent use in creating a message header bit array used in determining which of the endpoints to send at least a portion of the message to. Each bit set true in the message header bit array represents a match and appropriate bit placement corresponding to an address header within the list.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for efficiently determining appropriate endpoints for which at least a portion of a message is destined. The embodiments of the present invention may comprise a special purpose or general-purpose computer including various computer hardware, as discussed in greater detail below.

As previously described, endpoint services register using endpoint addresses (e.g., an endpoint references as defined in the WS-Addressing specification) for particular kinds of messages. An endpoint address typically has two main parts that need to match incoming messages for a particular endpoint receiver to be selected. The first will typically be a uniform resource identifier (URI) needed to match the value in the "To:" header of the message. Endpoint address, however, may specify whether the host of the URI should be ignored.

The second part of the match pertains to address headers in the endpoint addresses, which also should be present in the message. Such headers may appear in any order, but typically must appear at least the same number of times they are present in the endpoint address. Various normalization techniques are usually applied to the XML of the endpoint address headers and the message headers in order to compare for equivalence. Such normalization is computationally complex and expensive, and later sections will describe how various embodiments herein optimize the selection of those message headers to normalize.

In accordance with exemplary embodiments, matching the set of endpoint addresses to message headers can be conceptualized in terms of set operations. Instead of comparing each endpoint address with each message header individually, example embodiments provide a header-to-bit conversion table used to convert message headers into bit arrays for determining an intersection with an endpoint's required headers in constant time.

More specifically, the header-to-bit conversion table includes a list of address headers for registered endpoints. Assigned to each address header within the list is a bit placement for a string of bits; thus, each bit in the string represents an address header for each endpoint address. As messages are received, select headers within a message are compared with the address headers within the list. Each intersection or match for headers sets a bit true within a bit array for the message corresponding to the bit assignment for the appropriate address header within the header-to-bit conversion table. Such array may then be compared with bit masks for each endpoint, wherein those bits set true within the bit masks represent those headers needed to satisfy the criteria for that particular endpoint. If a match is found, the message (or portion(s) thereof) may be sent to the particular endpoint for processing.

Although more specific reference to advantageous features are described in greater detail below with regards to the FIGS, embodiments within the scope of the present invention also include computer-readable media for carrying or having computer-executable instructions or data structures stored thereon. Such computer-readable media comprise computer storage media and communication media. By way of example, and not limitation, computer storage media can comprise RAM, ROM, EEPROM, CD-ROM or other optical disk storage, magnetic disk storage or other magnetic storage devices. When information is transferred or provided over a network or another communications connection (either hardwired, wireless, or a combination of hardwired or wireless) to a computer, the computer properly views the connection as a communication medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

Figure 1A:
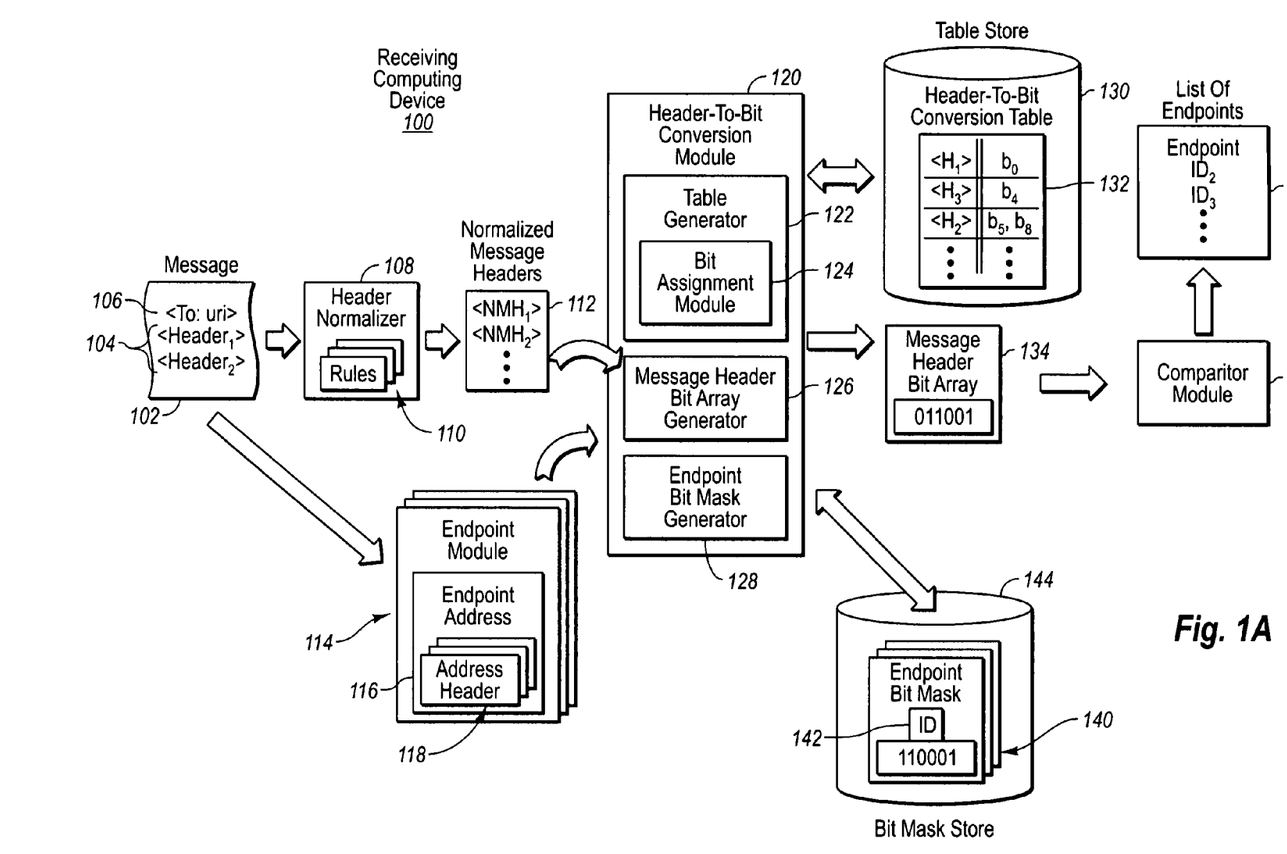
FIG. 1A illustrates a receiving computing device configured to efficiently determine which endpoint(s) to send a message for processing in accordance with example embodiments.

FIG. 1A illustrates a receiving computing device 100 that can process messages in accordance with example embodiments briefly described above. The following description of FIG. 1A will occasionally refer to other components and features within FIGS. 1B-1E and FIG. 2 as they correspond to FIG. 1A. Further note that in describing the Figures, reference may be made to specific components or modules for performing specific functions. The components or modules therein, however, may be combined or separated in any manner to perform any number of various functions. Accordingly, any specific topology, configuration, or use of a particular module for performing a specific function is used herein for illustrative purposes only and is not meant to limit or otherwise narrow the scope of embodiments described herein.

As shown in FIG. 1A, a message 102 with various headers 104, 106 may be received by computing device 100. Each various header 104, 106 includes information used in determining those endpoints for which at least a portion of the message is destined for processing. For example, message 102 includes a "To:" header 106 and Header$_1$ and Header$_2$ (104). Note, that although the message has only three headers, 104, 106, a message may include any number of headers. Further, the present invention is not limited to any particular type of address header (e.g., the "To:" header) for any particular endpoint service. Accordingly, any specific reference to any number or types of headers as described herein is used for illustrative purposes only and is not meant to limit or otherwise narrow the scope of embodiments described herein.

Regardless of the type of header 104, 106 within a message 102, as previously mentioned the headers 104, 106 will include information used in determining those endpoint module(s) 114 for which the message is destined for further processing. Accordingly, a match between the address header(s) 118 within each endpoint address 116 is needed. In order to determine such intersection, however, typically the message headers 104, 106 and endpoint address headers 118 need to be normalized. Accordingly, header normalizer 108 uses specific rules 110 for converting message headers 104, 106 (and address headers 118) to normalized form for identifying the equivalence thereof.

More specifically, an element can be represented many different ways, so that the test is more equivalence then equality. Various well known canonicalization processes exist for determining equivalence and may be used for embodiments described herein. Typically, however, most canonicalization methods have the problem that they cannot change the prefix a namespace is bound to. Accordingly, if any qualified names (i.e., the namespace prefix, local name, or both) were present in the data, there is typically no way of identifying and changing them. The problem is that two XML fragments that differ only in the namespace prefixes used will canonicalize to different forms. Accordingly, example embodiments can forbid the use of qualified names (or Qnames) in endpoint address headers content such that prefixes can now be normalized and the comparison becomes more accurate.

Exemplary embodiments also provide for normalization techniques using header normalizer 108 with a few other rules 110. Although the following description provides for specific rules 110, it is noted that any well known way of placing headers 104, 106, 118 in canonical form of unique data strings are available to embodiments described herein. In any event, the XML header data may be transformed into a string that looks similar to XML, but will not necessarily be valid. These strings (e.g., normalized message headers 112) can then be compared for strict equality since equivalent forms will yield the same string. The exemplary embodiments of rules 110 provided herein include: (1) removal of non-significant white space; (2) replacement of consecutive white space appearing in start tags (i.e., between attributes) with a single space; (3) removal of namespace declaration attributes; (4) replacing element and attribute names with a form of <local name>: <namespace URI> (e.g., a:b may transform to b:http://a.com); and (5) replacing end element tags with "<\>". In addition, various attributes may have associated therewith values that are known to include Qnames (e.g., namespace and/or local name). In such instance these Qnames may be allowed to appear in the endpoint address headers and can be expanded like element and attribute names.

Figure 1B:
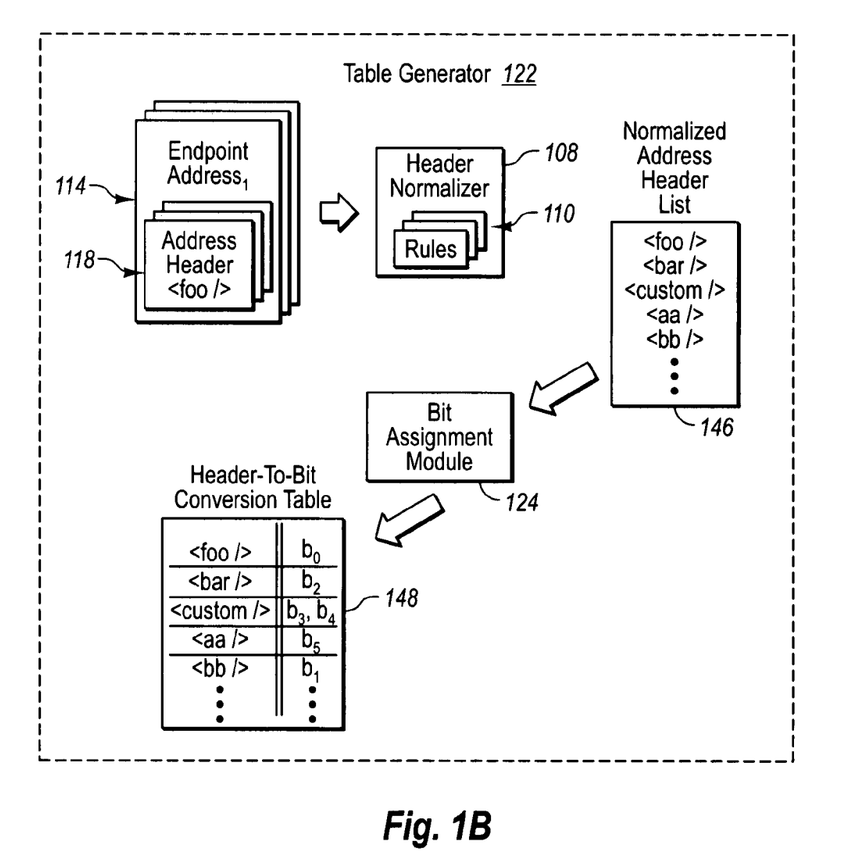
FIG. 1B illustrates a table generator for generating a header-to-bit conversion table in accordance with example embodiments.

By applying the various rules 110 using header normalizer 108, a list of normalized message headers 112 (e.g, NMH$_1$, NMH$_2$, etc.) is produced. These normalized headers 112 may then be processed using header-to-bit conversion module 120 for creating a message header bit array 134, which can then be used for determining those endpoint module(s) 114 for which at least a portion of the message 102 is to be sent for further processing. Prior to discussing the conversion of the message headers 104, 106 into message header bit array 134, it may be useful to describe how the header-to-bit conversion table 132 is created. More specifically, header-to-bit conversion module 120 includes a table generator 122 with a bit assignment module 124. FIG. 1B illustrates a more detailed description of how the table generator 122 may be used to create a header-to-bit conversion table 132, which can then be used to convert the normalized message headers 112 into message header bit array 134.

As shown in FIG. 1B, table generator 122 may evaluate the various registered endpoint addresses 116 to normalize address headers 118 using header normalizer 108 and rules 110—similar to the normalization of the message headers 104, 106 as previously described. These normalized address headers 118 may then be compiled into a list 146. Bit assignment module 124 can then variously assign bit placement for the address headers 118 within the list 146 (e.g., b$_0$, b$_1$, etc.). These bit placements are then mapped to the specific normalized address header 118 within header-to-bit conversion table 148, 132 and stored in table store 130. Note that the constructing of the above described header-to-bit conversion table may be computationally intensive, but may be computed as a setup cost.

Also note that duplicate headers across different endpoint addresses will typically be eliminated from consideration for bit assignment. For example, if an Endpoint Address$_1$ requires message header <foo /> and Endpoint Address$_2$ also includes a <foo /> header, only one bit placement value may be assigned to <foo />. Note, however, that in the case where an endpoint address 116 includes address headers 118 requiring two of the same headers, two bit placements will typically be assigned to the particular header. For example, if Endpoint Address$_1$ requires two copies of header <custom />, two bit placements will be assigned to such header (as shown in header-to-bit conversion table 148 as b$_3$, b$_4$). Thus, once all the endpoint addresses 116 have been processed, their data is collected into the header-to-bit conversion table 132 with each address header 118 mapped to its highest repetition value.

Figure 1C:
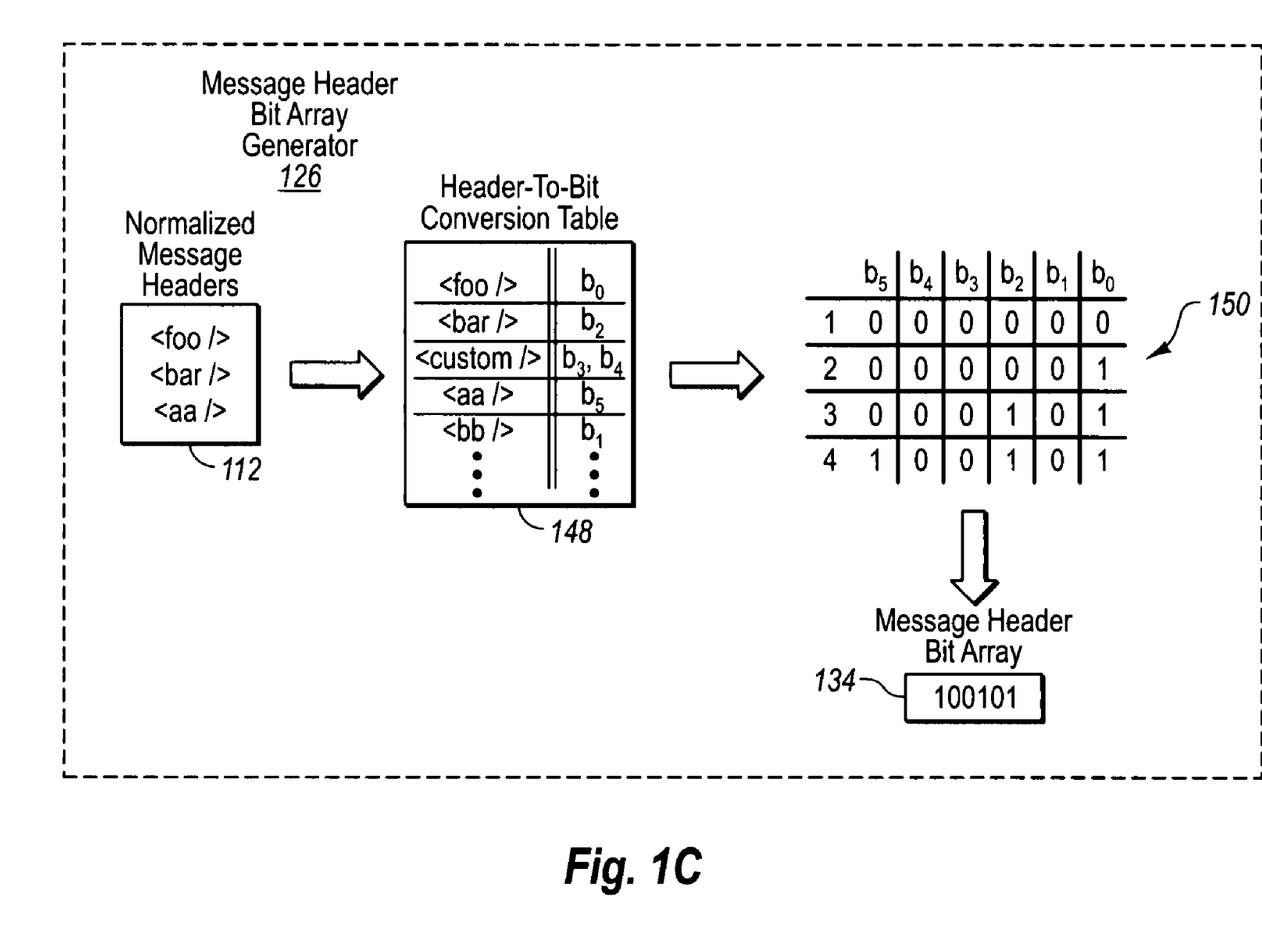
FIG. 1C illustrates a message header bit array generator in accordance with example embodiments.

Referring again to FIG. 1A, the header-to-bit conversion table 132 created using the table generator 122 may then be used by message header bit array generator 126 to produce a message header bit array 134. More specifically, FIG. 1C shows the message header bit array generator 126, wherein a list of message headers 104 are converted into message header (MH) bit array 134. When a message 102 is received, each bit in a bit string $b_0$-$b_5$—shown in the first row of bit assignment table 150—may be initialized to zero. Each header within the message header list 104 (or selected headers 104 as described in greater detail below with regards to optimizations) is then compared to the list of address headers 118 within header-to-bit conversion table 148. As matches are found within the header-to-bit conversion table 148, the corresponding bit is set true within the bit string.

For example, the message headers 104 are extracted from the message 102 to create a list; wherein for this example they include <foo />, <bar />, and <aa /> type headers. A match for the first header <foo /> is found within the header-to-bit conversion table 148, thus bit "$b_0$" is set true as shown in the second row of table 150. Similarly, headers <bar /> and <aa /> are also compared with the conversion table 148 to determine their various assignments, if any. In this example, <bar /> corresponds to bit placement "$b_2$" and <aa /> corresponds to "$b_5$"; thus, these bit values can be set true as shown in rows three and four of the bit assignment table 150. Upon determining the bit placement for the message headers 104, the resulting MH bit array 134 is generated. Note that those headers in the list 104 that do not match an address header 118 in the header-to-bit conversion table 148 may be ignored.

Also note that although the above message header bit array 134 was generated in accordance with a specific process (i.e., initializing the bit string to zero and stepping through each header bit assignment), other well known ways of generating the message header bit array 134 may be used. For example, instead of initially setting the bit values within a string to null, all of the bits may be set to true, wherein the message headers 104 not found may then be set to zero. Accordingly, any specific process used to generate message bit array 134 is used herein for illustrative purposes only and is not meant to limit or otherwise narrow the scope of embodiments described herein unless explicitly claimed.

In any event, once the message header bit array 134 is generated, it will be compared to a list of endpoint bit masks 140 from bit mask store 144. Each bit set true within an endpoint bit masks 140 represents a header 104 that a message 102 needs to have in order to satisfy criteria for a particular endpoint 114 receiver. Further, the bit masks 140 will each have associated therewith an ID 142 for referencing the appropriate endpoint module 114 when a match is found. These bit masks are typically pre-computed when the header-to-bit conversion table 132 is generated; however, they may also be generated dynamically or on the fly using bit mask generator 128.

Figure 1D:
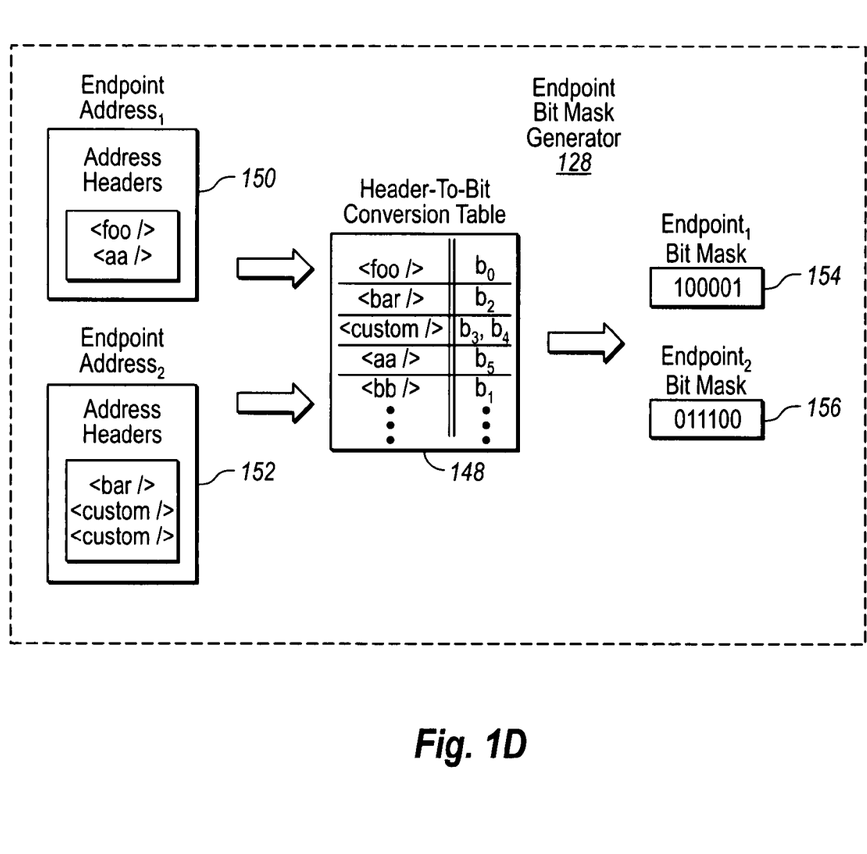
FIG. 1D illustrates an endpoint bit mask generator in accordance with example embodiments.

FIG. 1D illustrates a more detailed example of the endpoint bit mask generator 128 used in generating and storing 144 endpoint bit masks 140. Similar to the manner in which message header bit array 134 was generated, an endpoint address, e.g., 150, 152, can be received and compared against the header-to-bit conversion table 148. For example, as shown in FIG. 1D, Endpoint Address$_1$ (150) includes address headers <foo /> and <aa />. Accordingly, these headers are then compared to the header-to-bit conversion table 148 to generate Endpoint$_1$ bit mask 154, wherein the corresponding bits for <foo /> and <aa /> are set true (i.e., bits $b_0$, $b_5$). Similarly, Endpoint Address$_2$ 152 includes address headers for <bar /> and <custom />. These are then compared to the header-to-bit conversion table 148 to produce Endpoint$_2$ bit mask 156 (in which bits $b_2$, $b_3$, and $b_4$ are set true). Note that in this example, Endpoint Address$_2$ 152 requires two copies of header <custom />; and therefore, two bits (i.e., $b_3$, $b_4$) are assigned to the Endpoint$_2$ bit mask 156.

Also note that although the head-to-bit conversion table 148 was used in generating endpoint bit masks 154, 156, other well known ways of generating such bit masks 140 are also available to the present invention. For example, as the header-to-bit conversion table 132, 148 is being dynamically generated using table generator 122, the endpoint bit masks 140, 154, 156 can be simultaneously generated, without necessarily using the header-to-bit conversion table 132, 148. Accordingly, the use of the header-to-bit conversion table 132, 148 for generating the endpoint bit masks 140, 154, 156 is used herein for illustrative purposes only and is not meant to limit or otherwise narrow the scope of embodiments described herein unless explicitly claimed.

As previously mentioned, once the message header bit array 134 and endpoint bit masks 140 are generated, the message header bit array 134 will be compared to each endpoint bit mask 140 using comparator module 138. The result of such comparison will determine a list of endpoints 136 for which the message 102 (or a portion thereof) is to be sent for processing. As one would recognize, there are many well known ways for being able to compare such bits strings, all of which are available to embodiments described herein.

Figure 1E:
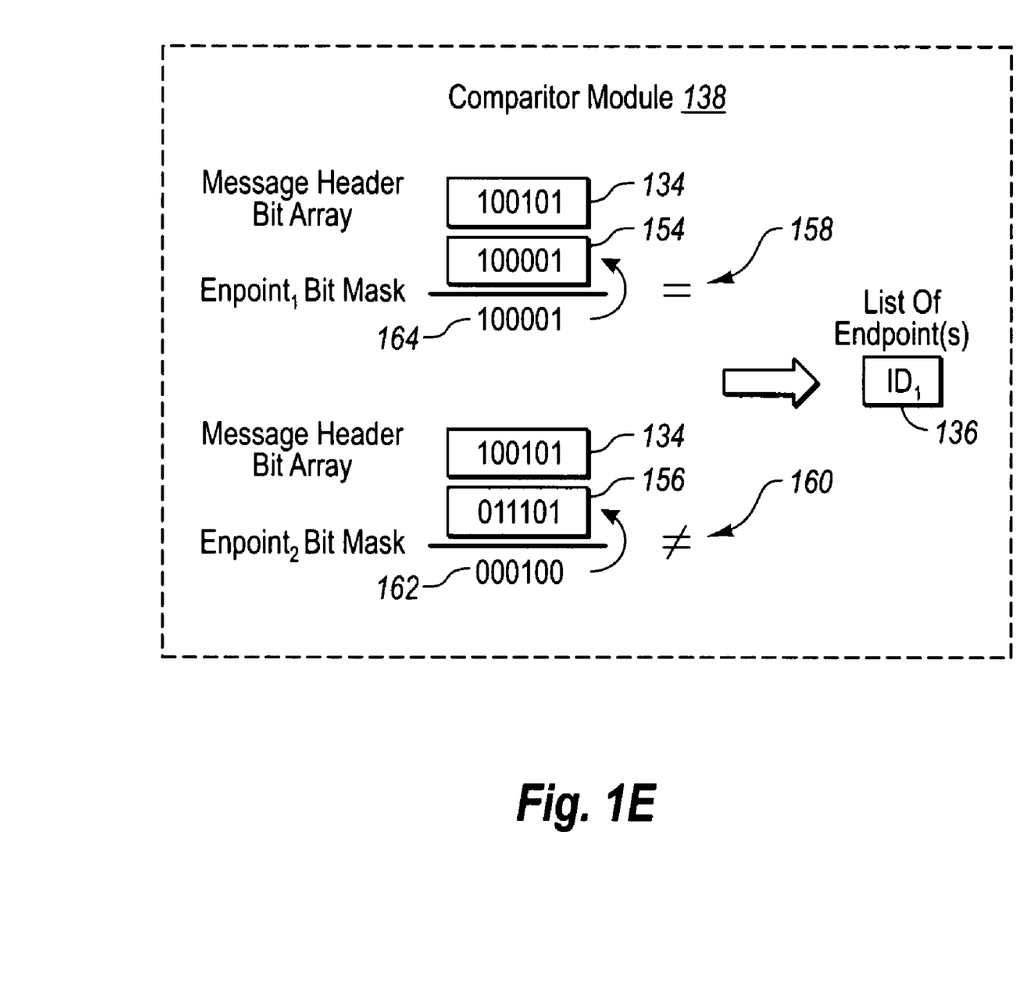
FIG. 1E illustrates a comparator module for comparing message header bit arrays and endpoint bit masks in accordance with example embodiments.

FIG. 1E illustrates a comparator module 138 that can perform such comparison using a bitwise "AND" operator. As shown, the message header bit array 134 may be ANDed with the Endpoint$_1$ bit mask 154 to produce the resulting bit string 164. Since the resulting bit string 164 equals 158 the Endpoint$_1$ bit mask 154, the message 102 satisfies the requirements for that particular endpoint 114. In contrast, when the message header bit array 134 is compared with Endpoint$_2$ bit mask 156, the resulting bit string 162 does not equal 160 bit mask 156. Accordingly, the ID 142 for Endpoint$_2$ will not be included in the list of endpoints 136.

Note that although the AND bitwise operation was used to compare the message header bit array 134 to the various bit masks 140, other operators and techniques are also available to the present invention. For example, there may be proprietary operations that do not specifically use bitwise operations for determining equivalence. Accordingly, the use of the AND operator for comparing bit strings as described herein is used for illustrative purposes only and is not meant to limit or otherwise narrow the scope of embodiments described herein unless explicitly claimed.

Figure 2:
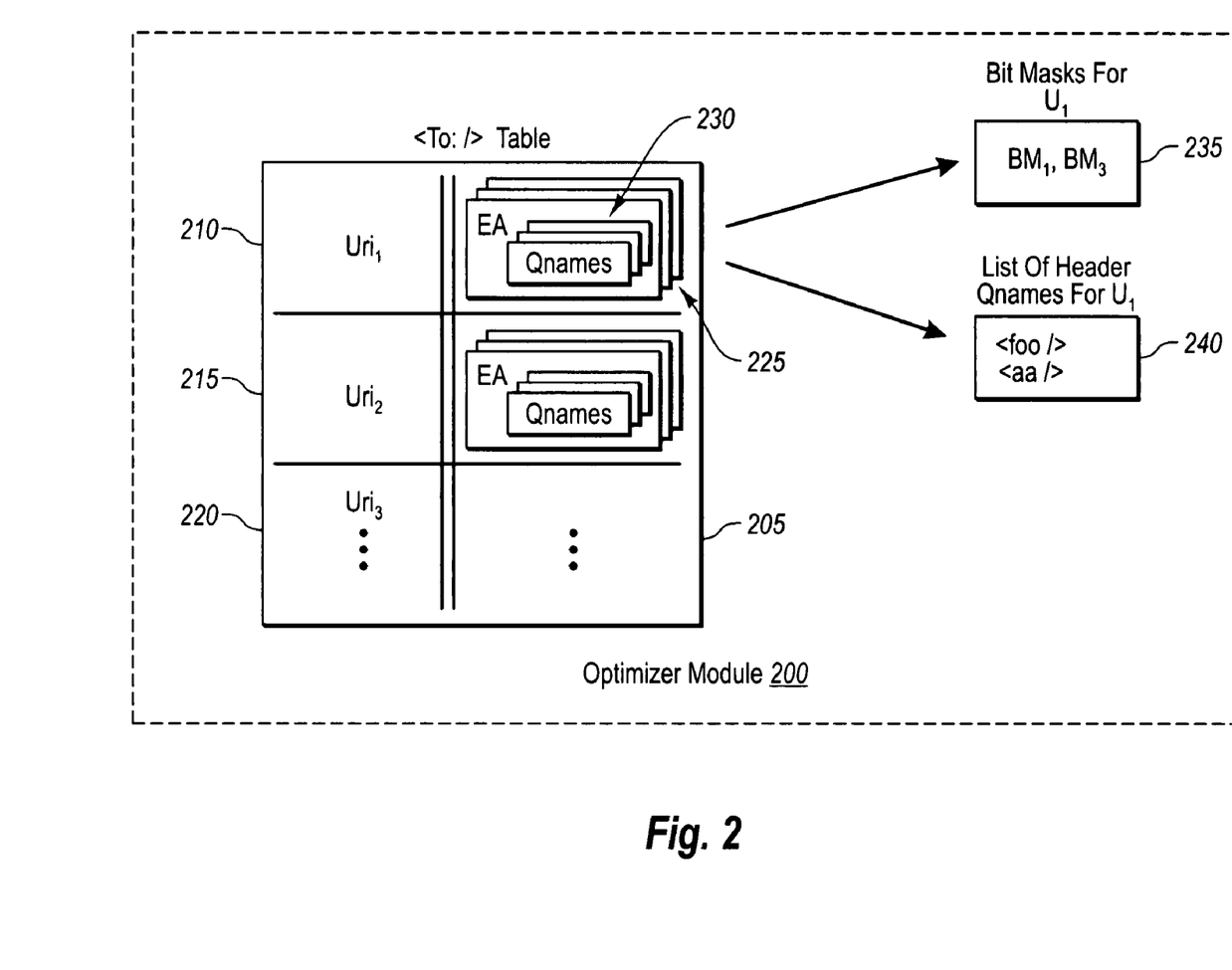
FIG. 2 illustrates an optimizer module for efficiently determining registered endpoints for sending a message in accordance with example embodiments.

As previously mentioned, other example embodiments advantageously optimize determining those bit masks 140 that a message header bit array 132 will be compared with, as well as determining a list of header Qnames that will be normalized to produce the message header bit array 132. For example, as shown in FIG. 2, a header <To: /> table 205 includes a reference to various URIs 210, 215, 220 and their corresponding endpoint address 225. Because the endpoint addresses can be looked up in the <To:/> table 205 this information can be accessed from the data structures and used in determining those bit masks 235 for a specific URI 210, 215, 220. In other words, rather than checking the message header bit array 134 against each endpoint bit mask 140, only those bit masks associated with that particular URI 210, 215, 220 will be compared to the message header bit array 134. Thus, additional time is saved in not having to do the comparison for every endpoint bit mask 140 within store 144.

Another similar optimization uses the qualified name or Qname 230 (e.g., namespace, prefix, local name, or both) for each endpoint address 225 associated with address headers for a particular URI 210, 215, 220. In this embodiment, the Qnames 230 may be identified within a table (e.g., hash table) in a similar manner as the endpoint addresses 225 previously described. This will define a list of candidate headers 104, 106 within the message 102 to normalize. Because the normalization is computationally heavy process, only those Qnames for headers 104 within a message 102 that match the Qnames 230 for a particular URI 210, 215, 220 will be normalized and processed into the message header bit array 134. Note, however, that this embodiment is not limited to just those Qnames for a particular URI 210, 215, 220. For example, embodiments provide that Qnames for the headers within the header-to-bit conversion table 148 may be used to determine those message headers 104, 106 that are to be normalized. Accordingly, any list of Qnames for reducing the normalization of message headers 104, 106 is contemplated herein.

Note that in the above example for lookup tables, the various values (e.g., URIs, Qnames, etc.) may be stored using a hash function for efficiency purposes. Of course, other tables and methods for efficiently looking up values are also available to the present invention. Accordingly, any specific use of a particular type of table for looking up values in accordance with exemplary embodiments provided herein is used for illustrative purposes only and is not meant to limit or otherwise narrow the scope of the embodiments described herein unless explicitly claimed.

The present invention may also be described in terms of methods comprising functional steps and/or non-functional acts. The following is a description of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts is the recitation of the claims—and in the following description of the flow diagrams for FIGS. 3A and 3B—is used to indicate the desired specific use of such terms.

Figure 3A:
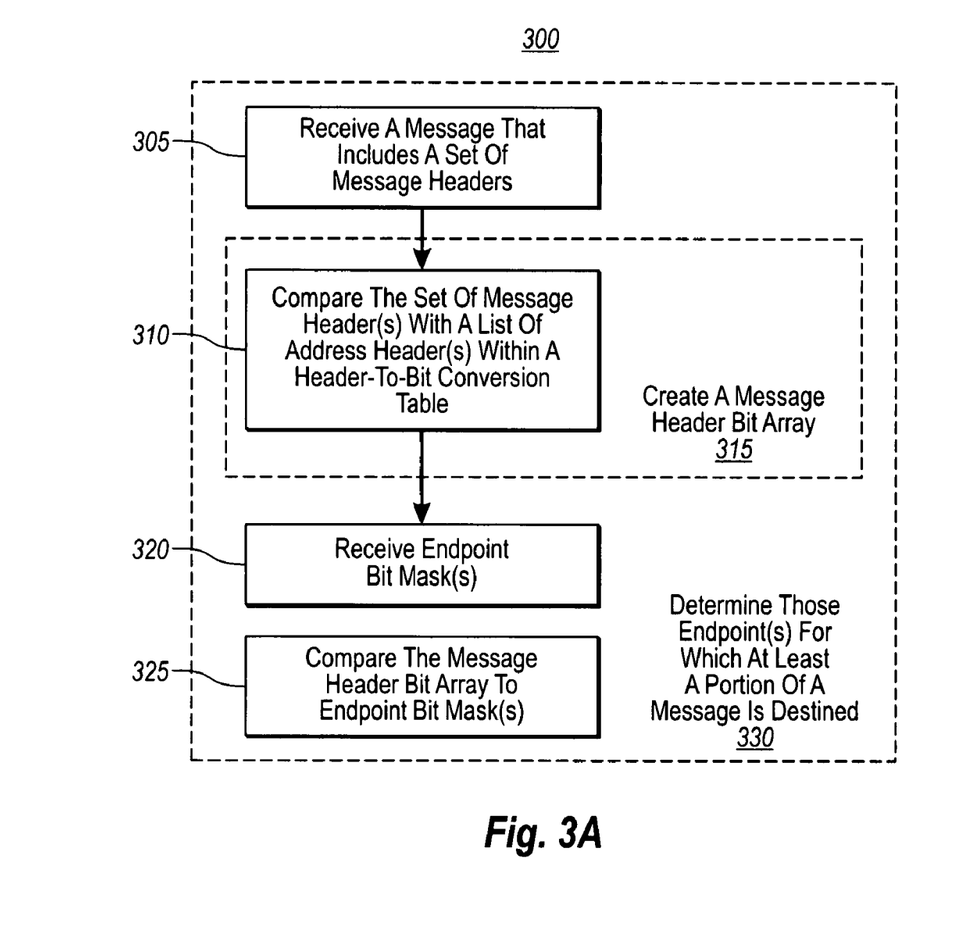
FIG. 3A illustrates a flow diagram of a method for efficiently determining registered endpoints for which at least a portion of a message is destined in accordance with example embodiments.
Figure 3B:
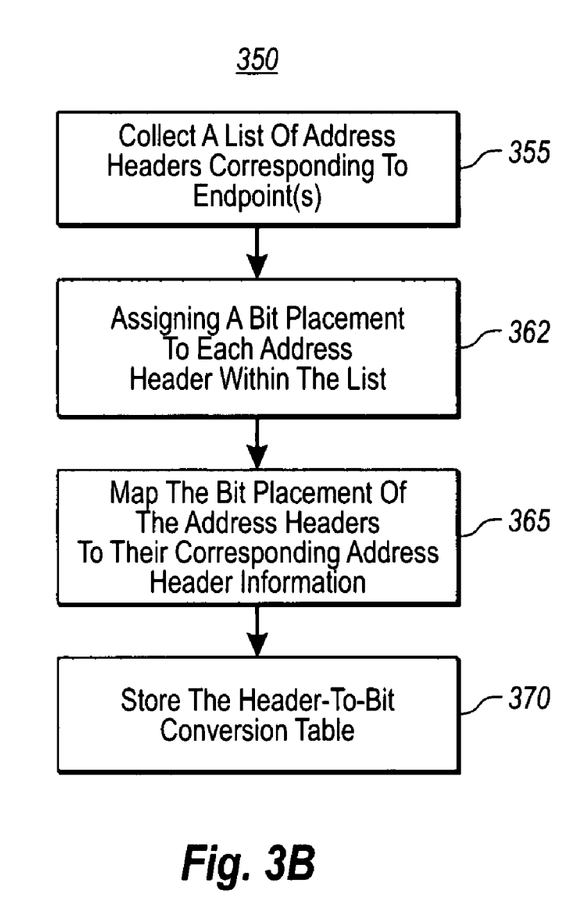
FIG. 3B illustrates a flow diagram for a method creating a header-to-bit conversion table in accordance with example embodiments.

As previously mentioned, FIGS. 3A and 3B illustrate flow diagrams for various exemplary embodiments of the present invention. The following description of FIGS. 3A and 3B will occasionally refer to corresponding elements from FIGS. 1A-E and FIG. 2. Although reference may be made to a specific element from these Figures, such elements are used for illustrative purposes only and are not meant to limit or otherwise narrow the scope of the described embodiments unless explicitly claimed.

FIG. 3A illustrates a flow diagram for a method 300 of efficiently determining those registered endpoints for which at least a portion of a message is destined, without having to compare each message header with each address header for each endpoint within each service. Method 300 includes a step for determining 330 those endpoint(s) for which at least a portion of a message is destined. Step for 330 includes an act of receiving 305 a message that includes a set of message headers. For example, the receiving computing device 100 may receive message 102 with message headers 104, 106 that comprise information used in determining those endpoints or endpoint modules 114 for which at least a portion of the message 102 is destined for processing. The message headers 104, 106 may be normalized using header normalizer 108 with a set of rules 110 that when implemented process identical unique data strings for equivalent portions of header, which without normalization appear different. Thus, the normalized message headers 112 can be used in subsequent steps for determining those endpoint modules 114 for which at least a portion of the message 102 is destined as described herein.

Step for 330 also includes a step for creating 315 a message header bit array. Moreover, step for 315 includes an act of comparing 310 the set of message header(s) with a list of address header(s) within a header-to-bit conversion table. For example, referring to FIGS. 1A and 1C, message header bit array generator 126 can take the message headers 104 and compare them to a header-to-bit conversion table 132, 148 producing the message header bit array 134. Each bit set true in the message header bit array 134 represents a match and appropriate bit placement corresponding to an address header 118 within the list. For example, the <foo /> header corresponds to the bit placement for bit $b_o$ and messages that include such header will have such bit in their bit array set true. Note that if an endpoint requires two copies of an address header 118, there may be two bits assigned to such header within the header-to-conversion table 132 representing the at least two copies (as shown, e.g., in header <custom /> in header-to-bit conversion table 148).

Step for 330 further includes an act of receiving 320 endpoint bit mask(s). For example, receiving computing device 100 may receive endpoint bit masks 140 from bit mask store 144, wherein each bit set true within the endpoint bit masks 140 represent a header that a message 102 needs to have in order to satisfy criteria of a particular endpoint receiver module 114. Note that the endpoint address bit masks 140 may be pre-computed and stored in bit mask store 140, or may be dynamically generated. Step for 330 also includes an act of comparing 325 the message header bit array to the endpoint bit mask. For example, referring to FIGS. 1A and 1E comparator module 138 can be used to compare message head bit array 134 with the endpoint bit masks 140 for determining a list a endpoints 136 for which at least a portion of the message 102 is destined. For example, the message header bit array 134 and endpoint bit masks 140 can be AND using a bitwise operation to determine those bit masks 140 that the message header bit array 134 satisfies. Of course, other well known and proprietary operators may be used in determining those endpoint modules 114 for which at least a portion of the message 102 is destined.

Note that exemplary embodiments provide for other optimizations in determining the endpoint modules 114 for which a message 102 is destined. For example, the message headers 106 may include a primary Uniform Resource Identifier (URI) as identified by <To: /> header 106. This URI 106 may then be looked up in a table 205 and used to identify the corresponding endpoint address 230 such that only bit masks 140 for the identified endpoints 114 are used for comparison with message header bit array 134.

Further, prior to normalizing the set of message headers 104, 106, exemplary embodiments provide for identifying a namespace prefix, local name, or both for the set of message headers to produce a list of qualified names for the set of message headers 104, 106. Further, namespace prefix, local name, or both can also be identified for each address header 118 of the identified endpoints 114 corresponding to the particular URI 210, 215, 220 to produce a list of qualified names 225 for each address header 118. The qualified names for the set of message headers 104, 106 can be compared with the qualified names for each address header 118 for determining a list of candidates representing the at least one portion of the set of message headers 104, 106 to normalize and compare with header-to-bit conversion table 132 when creating the message header bit array 134.

The above table used for determining the endpoint addresses 116 and/or address headers 118 may be a hash table, and a hash table can also be used to identify the namespace prefix, local name, or both, for each address header 118 for the identified endpoints of a particular URI 210, 215, 220.

FIG. 3B illustrates a flow diagram for a method 350 of creating a header-to-bit conversion table in accordance with exemplary embodiments. Method 350 includes an act of collecting 355 a list of address headers corresponding to endpoint(s). For example, table generator 122 within the header-to-bit conversion module 120 can use the information within the endpoint addresses 114 and the address headers 118 for creating an address header list 146. Each address header within the list 146 represents information a message 102 needs for satisfying at least a portion of criteria for the various endpoint modules 114.

Method 350 also includes an act of assigning 365 a bit placement to each address header within the list. For example, bit assignment module 124 within table generator 122 can assign a bit placement to each address header 118 within the list 146 to produce an array of bits representing each of the address headers 118. Thereafter, method 350 includes an act of mapping 365 the bit placement of the address headers to their corresponding address header information. For example, table generator 122 can map the bit placement of the address headers 146 to their address header information 118 in order to create a header-to-bit conversion table 132, 148.

Method 350 also includes an act of storing 370 the header-to-bit conversion table. For example, a header-to-bit conversion table 132, 148 may be stored in table store 130 for subsequent use in creating a message header bit array 134 used in determining which of the endpoint(s) 114 to send at least a portion of a message 102 to, wherein each bit set true in the message header bit array 134 represents a match and appropriate bit placement corresponding to an address header 118 within the list 146.

The above method may also include using the header-to-bit conversion table 132, 148 to create a bit mask 140 for each of the endpoints 114 by setting true each bit representing an address header 118 needed to satisfy that particular endpoint 114 criteria. The bit mask 140 may be stored in bit mask store 144 for subsequent comparison with the message header bit array 134. If the message header bit array 134 has bit(s) set true corresponding to address headers 118 needed to satisfy a particular endpoint's 114's criteria, at least a portion of the message 102 is sent to that endpoint 114. If the endpoint's 114's criteria require two copies of the address header 118, two bits may be assigned and mapped to the address header 118 within the header-to-bit conversion table 132.

Prior to assigning the bit placement to each address header 118 within the list, the above method may further determine if duplicate address headers 118 exist. For example, table generator 122 may be used for determining if duplicate address headers 118 exist within the list of address headers 118 across different endpoints 114 for eliminating such duplicates from the list. In other words, if two endpoint addresses 116 reference the same address header 118, one of the address headers 118 is eliminated such that no bit assignment will be given to that particular address heading 118 twice.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. At a receiving computing device in a distributed environment running one or more services for processing messages, a method of efficiently determining those registered endpoints for which at least a portion of a message is destined, without having to compare each message header with each address header for each endpoint within each service, the method comprising:

an act of receiving a SOAP message over a network that includes a set of message headers comprising information used in determining those endpoints for which at least a portion of the message is destined for processing, wherein at least one of the set of message headers includes a primary uniform resource identifier corresponding to the receiving computing device;

an act of normalizing at least a portion of one or more of the set of message headers using a set of rules that when implemented produce identical unique data strings for equivalent portions of headers, which without normalization appear different;

a step for creating a message header bit array by comparing the at least a portion of one or more of the set of message headers with a list of address headers within a header-to-bit conversion table, wherein each bit set true in the message header bit array represents a match and appropriate bit placement corresponding to an address header within the list;

an act of using the primary uniform resource identifier to identify one or more endpoints such that only bit masks for the identified one or more endpoints are used for the comparison with the message header bit array;

an act of receiving one or more endpoint bit masks wherein each endpoint bit mask corresponds to a particular endpoint of the one or more endpoints identified by the primary uniform resource identifier such that only bit masks for the identified one or more endpoints are used for the comparison with the message header bit array, and wherein each bit set true within each endpoint bit mask represents a header from the list of address headers that the message needs to have in order to satisfy criteria for the particular endpoint; and an act of comparing the message header bit array to the one or more endpoint address bit masks for determining those endpoints for which at least a portion of the SOAP message is destined.

2. The method of claim 1, wherein prior to normalizing the at least a portion of one or more of the set of message headers the method further comprises:

identifying a namespace prefix, local name, or both, for each of the set of message headers to produce a list of qualified names for the set of message headers;

identifying a namespace prefix, local name, or both, for each address header of the identified one or more endpoints to produce a list of qualified names for the each address header;

comparing the list of qualified names for the set of message headers with the qualified names for the each address header; and based on the comparison of the qualified names, determining a list of candidates representing the at least a portion of one or more of the set of messages headers to normalize and compare with the header-to-bit conversion table when creating the message header bit array.

3. The method of claim 2, wherein a hash table is used to identify the one or more endpoints.

4. The method of claim 3, wherein a hash table is used to identify the namespace prefix, local name, or both, for each address header of the identified one or more endpoints.

5. The method of claim 1, wherein the one or more endpoint address bit masks are pre-computed.

6. The method of claim 1, wherein a bitwise AND operator is used to compare the message header bit array to the one or more endpoint bit masks such that if a result of ANDing the message header bit array to one of the one or more endpoint bit masks equals the one of the one or more endpoint bit masks, it is determined that at least a portion of the SOAP message is destined for the endpoint corresponding to the one of the one or more endpoint bit masks.

7. The method of claim 1, wherein the header-to-bit conversion table is a hash table.

8. The method of claim 1, wherein a first endpoint requires at least two copies of an address header, and wherein a first endpoint bit mask from the one or more endpoint bit masks corresponds to the first endpoint such that it includes two bits set true representing the at least two copies.

9. The method of claim 1, wherein the header-to-bit conversion table is created by performing the following steps;
collecting all address headers that are included in the one or more endpoints, wherein each address header represents information a SOAP message needs for satisfying at least a portion of criteria for the one or more endpoints;
assigning a bit placement to each address header to produce an array of bits representing each of the address headers;
mapping the bit placement of the address headers to their corresponding address header information in order to create the header-to-bit conversion table; and
storing the header-to-bit conversion table for subsequent use in creating the message header bit array.

10. The method of claim 9, wherein prior to assigning the bit placement to each address header, the method further comprises:
determining if duplicate address headers exist across different endpoints for eliminating such duplicates from the list.

11. The method of claim 9, wherein one or more endpoints' criteria require two copies of a first address header, and wherein two bits are assigned and mapped to the first address header within the header-to-bit conversion table.

12. At a receiving computing device in a distributed environment running one or more services for processing SOAP messages, a computer program product for implementing a method of efficiently determining those registered endpoints for which at least a portion of a SOAP message is destined, without having to compare each message header with each address header for each endpoint within each service, the computer program product comprising one or more computer storage media having stored thereon computer executable instructions that, when executed by a processor, cause the computing device to perform the following:
receive a SOAP message over a network that includes a set of message headers comprising information used in determining those endpoints for which at least a portion of the SOAP message is destined for processing, wherein at least one of the set of message headers includes a primary uniform resource identifier corresponding to the receiving computing device;
an act of normalizing at least a portion of one or more of the set of message headers using a set of rules that when implemented produce identical unique data strings for equivalent portions of headers, which without normalization appear different;
create a message header bit array by comparing the at least a portion of one or more of the set of message headers with a list of address headers within a header-to-bit conversion table, wherein each bit set true in the message header bit array represents a match and appropriate bit placement corresponding to an address header within the list;
an act of using the primary uniform resource identifier to identify one or more endpoints such that only bit masks for the identified one or more endpoints are used for the comparison with the message header bit array;
receive one or more endpoint bit masks wherein each endpoint bit mask corresponds to a particular endpoint of the one or more endpoints identified by the primary uniform resource identifier such that only bit masks for the identified one or more endpoints are used for the comparison with the message header bit array, and wherein each bit set true within each endpoint bit mask represents a header from the list of address headers that the SOAP message needs to have in order to satisfy criteria for the particular endpoint; and
compare the message header bit array to the one or more endpoint address bit masks for determining those endpoints for which at least a portion of the SOAP message is destined.

13. The computer program product of claim 12, wherein prior to normalizing the at least a portion of one or more of the set of message headers, and wherein the computer program product further comprises computer executable instructions that can cause the distributed computing system to perform the following:
identify a namespace prefix, local name, or both, for each of the set of message headers to produce a list of qualified names for the set of message headers;
identify a namespace prefix, local name, or both, for each address header of the identified one or more endpoints to produce a list of qualified names for the each address header;
compare the list of qualified names for the set of message headers with the qualified names for the each address header; and
based on the comparison of the qualified names, determine a list of candidates representing the at least a portion of one more of the set of messages headers to normalize and compare with the header-to-bit conversion table when creating the message header bit array.

14. The computer program product of claim 12, wherein a bitwise AND operator is used to compare the message header bit array to the one or more endpoint bit masks such that if a result of ANDing the message header bit array to one of the one or more endpoint bit masks equals the one of the one or more endpoint bit masks, it is determined that at least a portion of the SOAP message is destined for the endpoint corresponding to the one of the one or more endpoint bit masks.

15. The computer program product of claim 12, wherein a first endpoint requires at least two copies of an address header, and wherein a first endpoint bit mask from the one or more endpoint bit masks corresponds to the first endpoint such that it includes two bits set true representing the at least two copies.

16. At a receiving computing device in a distributed environment running one or more services for processing SOAP messages, a method of efficiently determining those registered endpoints for which at least a portion of a SOAP message is destined, without having to compare each message header with each address header for each endpoint within each service, the method comprising:

receiving an endpoint address from each of a plurality of services, wherein each endpoint address includes one or more address headers;

generating a header-to-bit conversion table by extracting each address header from the plurality of endpoint addresses, normalizing each address header, and assigning a bit position to each address header;

generating a bit mask for each of the plurality of endpoint addresses by setting a corresponding bit of the bit mask for each address header that is included in the endpoint address, wherein the bit mask includes a bit for each address header that was extracted from the plurality of endpoint addresses;

receiving a SOAP message over a network that includes one or more headers that specify which service the message should be sent to, wherein at least one of the one or more headers includes a primary uniform resource identifier corresponding to the receiving computing device;

generating a message header bit array having the same number of bits as each of the plurality of bit masks by extracting the one or more headers from the SOAP message, normalizing at least one of the headers, and setting the corresponding bit of the message header bit array for each header, wherein each bit of the message header bit array and the bit at the same position of the bit mask correspond to the same header;

using the primary uniform resource identifier to identify one or more endpoints such that only bit masks for the identified one or more endpoints are used for the comparison with the message header bit array; and     comparing the message header bit array to each of the bit masks of the identified one or more endpoints to determine which service to send the SOAP message to such that upon determining that the message header bit array is the same as the bit mask for a first service, the SOAP message is sent to the first service.

\* \* \* \* \*